United States Patent
Moon

(10) Patent No.: US 10,180,842 B2
(45) Date of Patent: Jan. 15, 2019

(54) USER DEVICE AND INTEGRITY VERIFICATION METHOD OF THE SAME

(71) Applicant: ELECTRONICS AND TELECOMMUNICATIONS RESEARCH INSTITUTE, Daejeon (KR)

(72) Inventor: Yong Hyuk Moon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 182 days.

(21) Appl. No.: 15/068,111

(22) Filed: Mar. 11, 2016

(65) Prior Publication Data

US 2016/0274918 A1    Sep. 22, 2016

(30) Foreign Application Priority Data

Mar. 20, 2015 (KR) .................. 10-2015-0039016

(51) Int. Cl.
*G06F 9/4401* (2018.01)
*G06F 9/54* (2006.01)
*G06F 21/57* (2013.01)

(52) U.S. Cl.
CPC ............ *G06F 9/4406* (2013.01); *G06F 9/542* (2013.01); *G06F 21/57* (2013.01); *G06F 21/575* (2013.01); *G06F 2221/034* (2013.01)

(58) Field of Classification Search
CPC ...... G06F 9/4406; G06F 21/575; G06F 21/57; G06F 9/542; G06F 2221/034
See application file for complete search history.

(56) References Cited

U.S. PATENT DOCUMENTS

| 2007/0150857 | A1 | 6/2007 | Korkishko et al. |
| 2010/0011200 | A1* | 1/2010 | Rosenan ............... G06F 21/575 713/2 |
| 2012/0102333 | A1* | 4/2012 | Wong ...................... G06F 21/10 713/189 |
| 2012/0272296 | A1* | 10/2012 | Hodzic ................... G06F 21/51 726/4 |
| 2013/0219499 | A1 | 8/2013 | Park et al. |
| 2014/0150074 | A1* | 5/2014 | Galwas ................. H04L 9/3263 726/5 |
| 2014/0150096 | A1 | 5/2014 | Moon et al. |

FOREIGN PATENT DOCUMENTS

| KR | 10-2006-0119967 A | 11/2006 |
| KR | 10-2007-0069435 A | 7/2007 |
| KR | 10-2015-0007034 A | 1/2015 |
| WO | WO 2005/026877 A2 | 3/2005 |

* cited by examiner

*Primary Examiner* — Eleni A Shiferaw
*Assistant Examiner* — Cheng-Feng Huang

(57) ABSTRACT

Provided is an integrity verification method for a user device includes verifying integrity of a first verification target on a basis of a first integrity verification scheme during executing a boot-loader, uncompressing a kernel image according to the integrity verification result for the first verification target and verifying integrity of a second verification target on a basis of a second integrity verification scheme while the kernel image is uncompressed, and driving an operating system according to the integrity verification result for the second verification target and verifying integrity of a third verification target on a basis of a third integrity verification scheme while the operating system is driven.

14 Claims, 10 Drawing Sheets

USER DEVICE AND INTEGRITY VERIFICATION METHOD OF THE SAME

CROSS-REFERENCE TO RELATED APPLICATIONS

This U.S. non-provisional patent application claims priority under 35 U.S.C. § 119 of Korean Patent Application No. 10-2015-0039016, filed on Mar. 20, 2015, the entire contents of which are hereby incorporated by reference.

BACKGROUND

The present disclosure herein relates to a mobile system, and more particularly, to a user device and an integrity verification method of the same.

Mobile terminals such as a smartphone and table PC are used by many users due to their extendibility and portability. In these mobile terminals, various applications may be installed according to user selection. The mobile terminals may perform various data processing operations such as move, edit, copy, delete, or the like on the basis of the installed applications. However, a degree of freedom for data processing of the above-described mobile terminal may provide various attack chances to hackers. In particular, in a case of mobile terminal operated based on an open source such as Android, the above-described issues may seriously occur.

In detail, a typical mobile platform is difficult to determine whether each application is reliable and accordingly, treats all applications as an identical target. In particular, an open source-based operating system such as Android may structurally change the platform in an arbitrary way. Due to this, a security device and security means included in a user terminal may be arbitrarily changed. As an example, in an Android-based user terminal, all applications may be executed by a Dalvik Virtual machine. However, a typical integrity verification program considers a virtual machine as an execution file and does not perform verification on a state of a system resource, which is internally executed by the virtual machine.

In addition, a mobile terminal, in which some of important system components thereof are damaged, may be used as a main tool for financial accident and social threat according to illegal acquisition of personal information. Accordingly, a user or service provider requires a means for reliably verifying a mobile terminal.

Furthermore, the mobile terminal has a resource-limited characteristic unlike a typical desktop PC. Recently, with the development of electronic techniques such as a multi-core and large-scale flash memory, limitations on use of resources are somewhat resolved. However, in order to support more rapid calculation ability and input/output speed, high clock frequency-based processors and memories operate and recently developed applications require rapid computational cycles and large-scale storage spaces. Due to these requirements, an issue of increase in power consumption occurs in the mobile terminal.

Typical integrity verification methods provide all-time security monitoring but operate based on a short period in order to improve security reliability. Since the short period-based verification operation acts as a main cause of performance degradation and acceleration in power consumption of the mobile terminal, it is improper to verify a reliable state of a mobile terminal platform. In addition, an existing Trusted Platform Module (TPM) or Mobile Trusted Module (MTM) specification has very high complexity in realization with software to cause relatively lots of power consumption in the mobile terminal.

SUMMARY

The present disclosure provides a user device having improved reliability and performance by effectively verifying integrities on a user application and execution environment of the user application, and an integrity verification method for the same.

An embodiment of the inventive concept provides an integrity verification method for a user device. The integrity verification method includes: verifying integrity of a first verification target on the basis of a first integrity verification scheme during executing a boot-loader; uncompressing a kernel image according to the integrity verification result for the first verification target and verifying integrity of a second verification target on the basis of a second integrity verification scheme while the kernel image is uncompressed; and driving an operating system according to the integrity verification result for the second verification target and verifying integrity of a third verification target on the basis of a third integrity verification scheme while the operating system is driven, wherein the first verification target includes the boot-loader and kernel image, the second verification target includes a system component and files related to a pre-installed application, and the third verification target includes the system component and files related to an application to be executed, and each of the first to third integrity verification schemes are a static verification scheme or a dynamic verification scheme according to the first to third verification targets.

In an embodiment, the integrity verification method may further include executing a boot control code to perform initialization before the boot-loader is executed.

In an embodiment, the verifying of integrity of the first verification target may include: extracting integrity values of the boot-loader and kernel image; verifying integrities of the boot-loader and kernel image on the basis of the integrity values; and stopping the execution of the boot-loader when the integrities of the boot-loader and kernel image are damaged.

In an embodiment, the first integrity verification scheme may be the static verification scheme in which the integrity verification is performed every time the boor-loader is executed.

In an embodiment, the verifying of integrity of the second verification target may include: detecting an event for the system component; verifying integrity of the system component on the basis of a preset system component verification policy before booting when the event is a load event to a memory; and performing the event for the system component when the integrity of the system component is ensured, and recording a log message without performing the event for the system component when the integrity of the system component is damaged.

In an embodiment, the preset system component verification policy before booting may include at least any one of first to fourth verification policies, wherein the first verification policy indicates a policy for verifying integrity for all system components, the second verification policy indicates a policy for verifying integrity for an important system component among the system components, the third verification policy indicates a policy for grouping the system components to verify integrity, and the fourth verification policy indicates a policy for verifying integrity of the system component on the basis of an accumulated one way hash function.

In an embodiment, the verifying of integrity of the second verification target may further include verifying integrity of files related to the preset application.

In an embodiment, the second integrity verification scheme may include the dynamic verification scheme in which the integrity verification is performed according to whether an event for the system component occurs and the static dynamic verification scheme in which the integrity verification is performed for files related to the preset application.

In an embodiment, the verifying of integrity of the third verification target may include: detecting an event for the system component; determining whether the event is a load event to the memory; reading a binary file of the system component when the event is the load event and reading the system component stored in the memory when the event is not the load event; verifying integrity of the read system component on the basis of a pre-determined system component verification policy; and performing the event when the integrity of the read system component is ensured, and recording a log message without performing the event when the integrity of the read system component is damaged.

In an embodiment, the verifying of integrity of the third verification target may further include: verifying integrity of the installation file of the application to be executed; and stopping execution of the application to be executed when the integrity of the installation file of the application to be executed is damaged, and recording the log message.

In an embodiment, the verifying of integrity of the third verification target may further include: detecting an event for a system class related to the application to be executed when the integrity of the installation file of the application to be executed is ensured; verifying the integrity of the system class on the basis of the pre-determined application verification policy; and forcibly terminating the application to be executed when the integrity of the system class is damaged.

In an embodiments of the inventive concept, a user device includes: an application processor configured to perform a booting operation including a device initialization operation, boot-loader execution operation, kernel execution operation, and operating system driving operation; a memory to which a system component and application-related files are loaded according to a control of the application processor; a device integrity verifier configured to extract integrity values of the system component or the application-related files according to each operation of the booting operation; and a security device configured to verify integrity of a verification target on the basis of the extracted integrity values, wherein the device integrity verifier receives the verification result from the security device and stops an operation for the system component or application-related files according to the received verification result to terminate the booting operation.

In an embodiment, the security device may include: a communication unit configured to perform encrypted serial communication with the device integrity verifier; a shield memory configured to store data and key values related to integrity verification for the system component and application-related files; and a processor configured to perform the integrity verification on the basis of the extracted integrity values, wherein the security device performs encrypted communication with the device integrity verifier on the basis of the key value.

In an embodiment, the device integrity verifier may be driven according to a control of the application processor.

BRIEF DESCRIPTION OF THE FIGURES

The accompanying drawings are included to provide a further understanding of the inventive concept, and are incorporated in and constitute a part of this specification. The drawings illustrate example embodiments of the inventive concept and, together with the description, serve to explain principles of the inventive concept. In the drawings.

DETAILED DESCRIPTION

Example embodiments of the inventive concept will be described below in more detail with reference to the accompanying drawings. The inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art.

Hereinafter, embodiments of the present invention will be described in detail with reference to the accompanying drawings so that the present invention can be easily practiced by those skilled in the art.

In this specification, components which are described with reference to terms "unit", "module", "layer", and the like may be implemented with software, hardware, or a combination thereof. In exemplary embodiments, software may be firmware, embedded code, and application software. For example, hardware may include a circuit, a processor, a computer, an integrated circuit, integrated circuit cores, a pressure sensor, an inertial sensor, microelectromechanical system (MEMS), a passive element, or a combination thereof.

Figure 1:
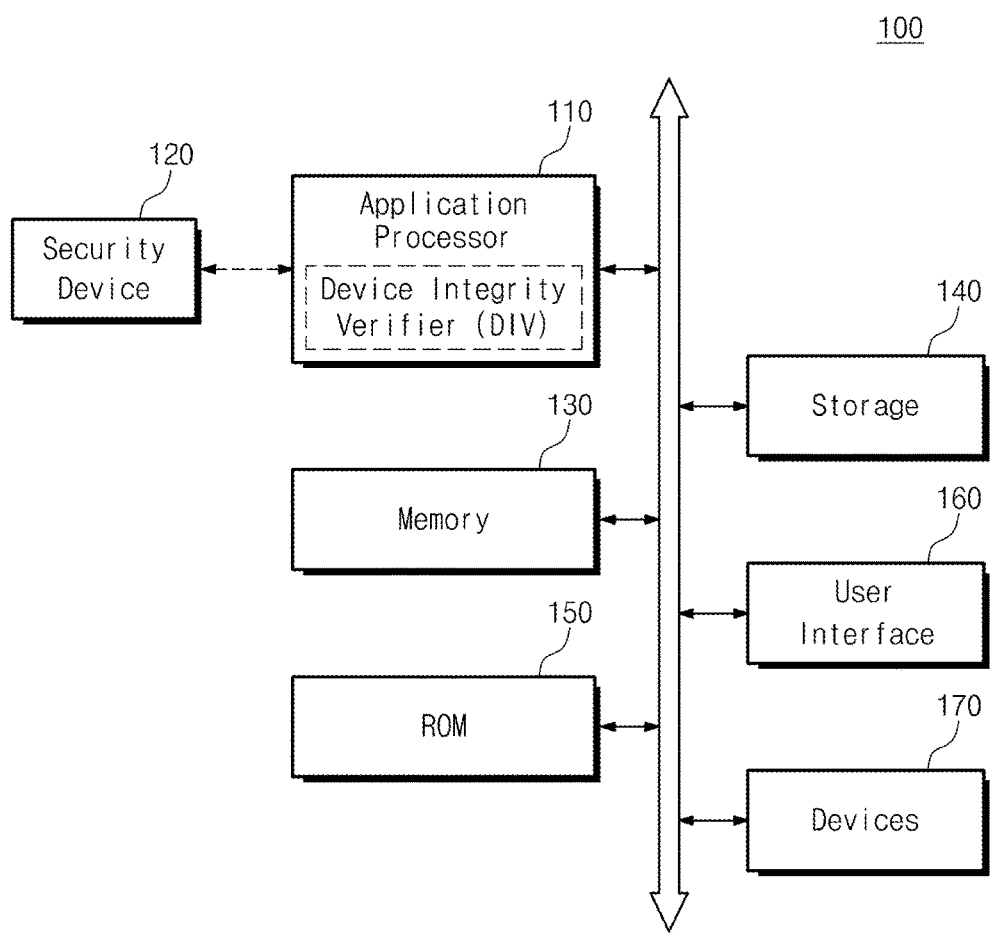
FIG. 1 is a block diagram of a user device according to an embodiment of the inventive concept.

FIG. 1 is a block diagram of a user device according to an embodiment of the inventive concept. Referring to FIG. 1, a user device 100 includes an application processor (AP) 110, a security device 120, a memory 130, a storage unit 140, a ROM 150, a user interface 160, and devices 170. For example, the user device 100 may include at least one of a computer, mobile computer, ultra mobile PC, workstation, net-book, PDA, portable computer, web tablet, wireless phone, mobile phone, smartphone, digital camera, digital audio recorder, digital audio player, digital picture recorder, digital picture player, digital video recorder, a digital video player, a device for transmitting/receiving information in a wireless environment, or various computing systems configuring a home network.

The AP 110 may control an entire operation of the user device 100. For example, the AP 110 may perform a calculation operation for operations such as booting, integrity verification, application execution, or the like.

For example, the AP 110 may include a device integrity verifier DIV. The device integrity verifier DIV may extract integrity values of system components loaded to the memory 130 or accessed in the memory 130, application files executed by the AP 110, and system classes required for executing an application, and may transmit the integrity values to the security device 120. As a more detailed example, the device integrity verifier DIV may extract integrity values of execution files, library files, system modules, system demons, or the like. For example, the device integrity verifier DIV may extract the integrity values by hashing byte values of verification target files. For example, the device integrity verifier DIV may perform the integrity verification operation based on different verification policies according to a booting operation or execution operation of the user device 100, or according to a verification target.

For example, the device integrity verifier DIV may be realized in a software type, hardware type, or a combination thereof. For example, the hardware may be an electrical/electronic device, processor, computer, integrated circuit, integrated circuit core, micro-electromechanical system (MEMS), passive elements, or a combination thereof. For example, the software may be a mechanical code, program instruction, firmware, embedded code, application software, or a combination thereof. For example, the device integrity verifier DIV realized in a software type may be stored in a cache memory in the AP 110 and driven by the AP 110.

The security device 120 may receive the integrity value from the device integrity verifier DIV of the AP 110 and execute integrity verification on the received integrity value. For example, the security device 120 may include integrity-related values or key values for each of verification targets (e.g. system component, application, system class, or the like) used in the user device 100. The security device 120 may receive the integrity values according to a request from the device integrity verifier DIV and execute the integrity verification operation based on the received integrity values and related data. The security device 120 may transmit the verification result to the device integrity verifier DIV.

For example, the security device 120 and AP 110 may communicate based on a communication channel or secure channel of which reliability is ensured. For example, the communication channel may be an encrypted serial communication channel. For example, the security device 120 may be provided in a system on chip (SoC) type. The security device 120 may be embedded in one integrated circuit to be realized in one chip, one module, or one card type. For example, the security device 120 may be included in the AP 110.

For example, the security device 120 may be realized by a minimum combination of hardware and software necessary for integrity verification. For example, the security device 120 may be realized with a calculation processor for performing an algorithm such as encryption, decryption, key management, hashing, or the like that is necessary for the integrity verification.

The memory 130 may be used as an operation memory, main memory, buffer memory, or cache memory of the user device 100 or AP 110. For example, the memory 130 may include a random access memory device such as SRAM, DRAM, SDRAM, DDR SDRAM, LPDDR SDRAM, SRAM, PRAM, RRAM, MRAM or the like. For example, files used by the AP 110 may be loaded to the memory 130 and files stored in the memory 130 may be accessed by the AP 110. For example, the memory 130 may be a cache memory of the AP 110.

The storage unit 140 may store information, data, or files used in the user device 100. For example, the storage unit 140 may store various data such as an application execution file, boot-loader, kernel image, and operating system driving file used in the user device 100. For example, the storage unit 140 may include a large scale nonvolatile memory device such as a hard disk or flash memory.

The ROM 150 may store various informations or program codes required for the operation of the user device 100 in a firmware type. For example, the ROM 150 may include a booting control code required for booting the user device 100. For example, the data or program code stored in the ROM 150 may be unchangeable data or program code, and data or program code of which integrity is verified.

The user interface 160 may include an interface for inputting data or instructions to the AP 110 or outputting data to an external device. For example, the user interface 160 may include a user input interface such as a keyboard, keypad, button, touch panel, touch screen, touch pad, touch ball, microphone, gyroscope sensor, vibration sensor, piezoelectric sensor, or the like. The user interface 160 may include a user output interface such as a Liquid Crystal Display (LCD), Organic Light Emitting Diode (OLED) display device, Active Matrix OLED (AMOLED) display device, LED speaker, monitor, or the like.

The devices 170 may include various devices used in the user device 100. For example, the devices 150 may include devices such as a graphic processing unit (GPU), heartbeat sensor, camera, communication module, or the like.

Figure 2:
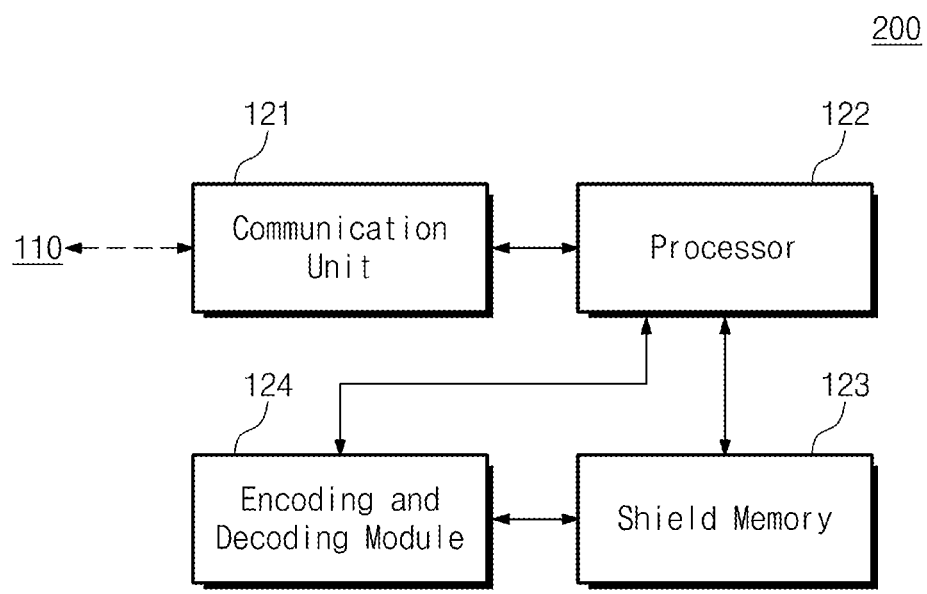
FIG. 2 is a block diagram illustrating in detail the security system of FIG. 1.

FIG. 2 is a block diagram illustrating in detail the security system of FIG. 1. Referring to FIGS. 1 and 2, the security device 120 includes a communication unit 121, a processor 122, a shield memory 123, and an encoding and decoding module 124.

The communication device 121 may provide a communication interface between the AP 110 and security device 120. For example, a communication interface between the AP 110 and security device 120 may be an encrypted serial communication interface of which reliability is ensured.

The processor 122 may control the entire operation and calculation operation of the security device 120. For example, the processor 122 may perform the calculation operation such as encryption, decryption, hashing, key generation, or key revocation in order to verify the integrity value received from the device integrity verifier DIV.

The shield memory 123 may store data or a key value for verifying integrity. The shield memory 123 indicates a memory that arbitrary data change or data leak is not possible by an external attack. In other words, the data or key value for integrity verification, which is stored in the shield memory, may be not changed or leaked by the external attack.

The encoding and decoding module 124 may decrypt a signal received through the communication unit 121 or encrypt a signal to be transmitted through the communication unit 121. For example, the encoding and decoding module 124 may be provided in a software or hardware type. The encoding and decoding module 124 in software type may be executed by the processor 122.

In other words, the processor 122 may encrypt the verification result through the encoding and decoding module 124 to transmit the encrypted result to the device integrity verifier DIV.

For example, the security device 120 may perform reliable encryption communication with the device integrity verifier DIV on the basis of a key value.

Figure 3:
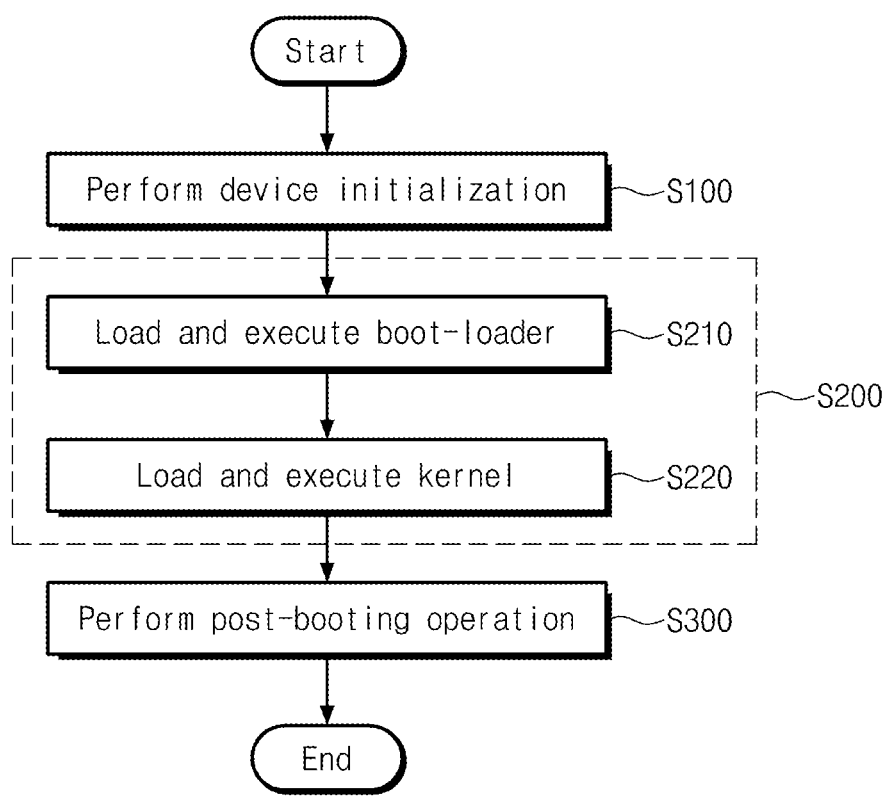
FIG. 3 is a flowchart illustrating an operation of the user device of FIG. 1.

FIG. 3 is a flowchart illustrating an operation of the user device of FIG. 1. Hereinafter, unless otherwise defined, each operation is assumed to be a software type operation realized by the AP 110. However, the integrity verification operation is assumed to be performed by the security device 120 on the basis of an integrity value extracted by the device integrity verifier DIV. However, the scope of the present invention is not limited hereto.

In operation S100, the user device 100 may perform device initialization. For example, when the user device 100 is powered on, a booting control code stored in the ROM 150 of the user device 100 may be loaded on a predetermined address of the memory 130. The AP 110 may access the predetermined address of the memory 130 to execute the booting control code. For example, the booting control code may include a check for whether various hardware devices included in the user device 100 are abnormal, or a program code for performing a power-on self test (POST) such as the initialization. For example, the booting control code may be a program code stored in the ROM 150 and integrity thereof is ensured. In other words, a separate integrity verification operation for the booting control code may not be performed.

In operation S200, the user device 100 may perform a booting operation. For example, operation S200 includes operations S210 and S220. In operation S210, the user device 100 may load and execute a boot-loader. For example, the boot-loader indicates a program that is executed in advance before the operating system is driven and that performs a job required to normally drive a kernel. For example, the boot-loader may be loaded to a partial area of the memory 130. The AP 110 may access the partial area of the memory 130 to execute the boot-loader and perform initialization setting for hardware (e.g. memory, CPU clock, GPIO, serial or MAC address) of the user device 100. For example, in operation S210, the user device 100 may perform integrity verification for the boot-loader and kernel image. For example, the device integrity verifier DIV may extract integrity values of the boot-loader and kernel image and transmit the extracted integrity values to the security device 120. For example, the security device 120 may perform the integrity verification for the boot-loader and kernel image on the basis of the extracted integrity values, and transmit the verification result to the device integrity verifier DIV. For example, when the integrity of the boot-loader or kernel image is not verified (i.e. when the boot-loader or kernel image is not changed), the user device 100 may record a log message and terminate the booting operation. For example, the integrity verification operation for the boot-loader and kernel image may be static verification. The static verification indicates the integrity verification for a predefined element in a predetermined code execution operation regardless of an occurrence time of a predetermined event. For example, the kernel image indicates data that the kernel and kernel-related information are compressed.

In operation S220, the user device 100 may load and execute the kernel. In other word, the user device 100 may perform a kernel booting operation. For example, various system components configuring the kernel may be loaded to the memory 130. For example, the user device 100 may perform integrity verification for each of system components loaded to the memory 130. For example, the user device 100 may detect an event that a system component is loaded to the memory 130 and verify integrity of the system component to be loaded in response to the detected event. The integrity verification operation is described with reference to operation S210, and detailed description thereabout will be omitted. For example, the integrity verification operation for the system components may be dynamic verification. The dynamic verification indicates integrity verification for an element corresponding to an occurrence time of a predetermined event. For example, the kernel indicates a program having a control authority for elements (e.g. a memory, storage unit, and the like) included in the user device 100. The kernel may manage an access to a memory and manage hardware resources.

For example, in operation S220, the user device 100 may verify applications installed in the user device 100 and user processes related thereto. At this point, the integrity verification operation for the applications and user processes related thereto may be statically performed regardless of occurrence of an event.

For example, when the integrity is not ensured (i.e. when the integrity is damaged) according to the integrity verification result in operation S220, the user device 100 may terminate the booting operation.

In operation S300, the user device 100 may perform a POST-booting operation. For example, the user device 100 may perform operations S100 to S220 to complete the kernel booting. The user device 100 may execute an operating system and various applications under the operating system. For example, in operation S300, the user device 100 may detect an event for accessing the memory 130, to which system components are loaded, in an environment where the operating system is driven, an event for loading an application and application-related execution element to the memory 130, or an event for executing a user process, and may perform integrity verification for corresponding elements in response to the detected event.

In other words, the integrity verification in operation S300 may be dynamic verification.

For example, the integrity verifications in the foregoing booting operations may be performed based on different verification policies. For example, in operations S220 and S300, each of integrity verification operations for the system components may be performed based on any one of verification policies shown in Table 1.

TABLE 1

| System component verification policy | Content |
|---|---|
| First system component verification policy | Individual verification for all system components |
| Second system component verification policy | Individual verification for important system components |
| Third system component verification policy | Group unit verification |
| Fourth system component verification policy | Accumulated one-way hash application |

Referring to Table 1, the integrity verification operation for the system components may be performed based on any one of the first to fourth system component verification policies. The first system component verification policy indicates a policy for performing integrity verification for each of all the system components. The second system component verification policy indicates a policy for selecting important system components among the system components and performing integrity verification therefor. The third system component verification policy indicates a policy for grouping the system components to perform integrity verification therefor. The fourth system component verification policy indicates a policy for comprehensively performing integrity verification for all system components by using an accumulated one-way hash function. For example, according to a characteristic of the accumulated one-way hash function of the fourth system component verification policy, accumulated hashing may be performed regardless of a sequence of system components to derive a value that is the same at all time. In other words, integrity measurement and verification may be facilitated.

For example, the first to fourth system component verification policies have a low verification level in that order. In other words, the first system component verification policy has higher reliability than the second system component verification policy, the second system component verification policy has higher reliability than the third system component verification policy, and the third system component verification policy has higher reliability than the fourth system component verification policy.

For example, the first system component verification policy requires more calculations and time than the second system component verification policy. In other words, the first, second, third, and fourth system component verification policies have high use efficiency of resources in that order. In other words, the first system component verification policy has a lower resource use efficiency than the second system component verification policy, the second system component verification policy has a lower resource use efficiency than the third system component verification policy, and the third system component verification policy has a lower resource use efficiency than the fourth system component verification policy.

For example, in operation S300, the dynamic integrity verification policy for an application may be performed based on any one of verification policies shown in Table 2.

TABLE 2

| Application verification policy | Content |
| --- | --- |
| First application verification policy | Verify application installation files and all parts of system classes |
| Second application verification policy | Verify application installation files and only execution code area of system classes |
| Third application verification policy | Verify only application installation files |

Referring to Table 2, the dynamic integrity verification policy for an application may be performed based on any one of the first to third application verification policies. The first application verification policy indicates a policy for performing integrity verification for application installation files and all parts of system classes obtained by system components. The second application verification policy indicates a policy for performing integrity verification for application installation files and an execution code area of system classes obtained by system components. The third application verification policy indicates a policy for performing integrity verification for application installment files.

For example, similar to description in relation to Table 1, the first, second, and third application verification policies have low verification level and high use efficiency of resources in the that order.

As described above, the user device 100 according to an embodiment of the inventive concept periodically performs integrity verification for a system component to be loaded to the memory 130 in each of the booting operations, a system component loaded to the memory 130, and an application file. Accordingly, the user device 100 having improved reliability and an integrity verification method thereof are provided.

In addition, the user device 100 may perform the integrity verification operation through the security device 120 and employ different verification policies for each of the booting operations to minimize an overhead according to the integrity verification. Accordingly, the user device 100 having improved reliability and an integrity verification method thereof are provided.

Figure 4:
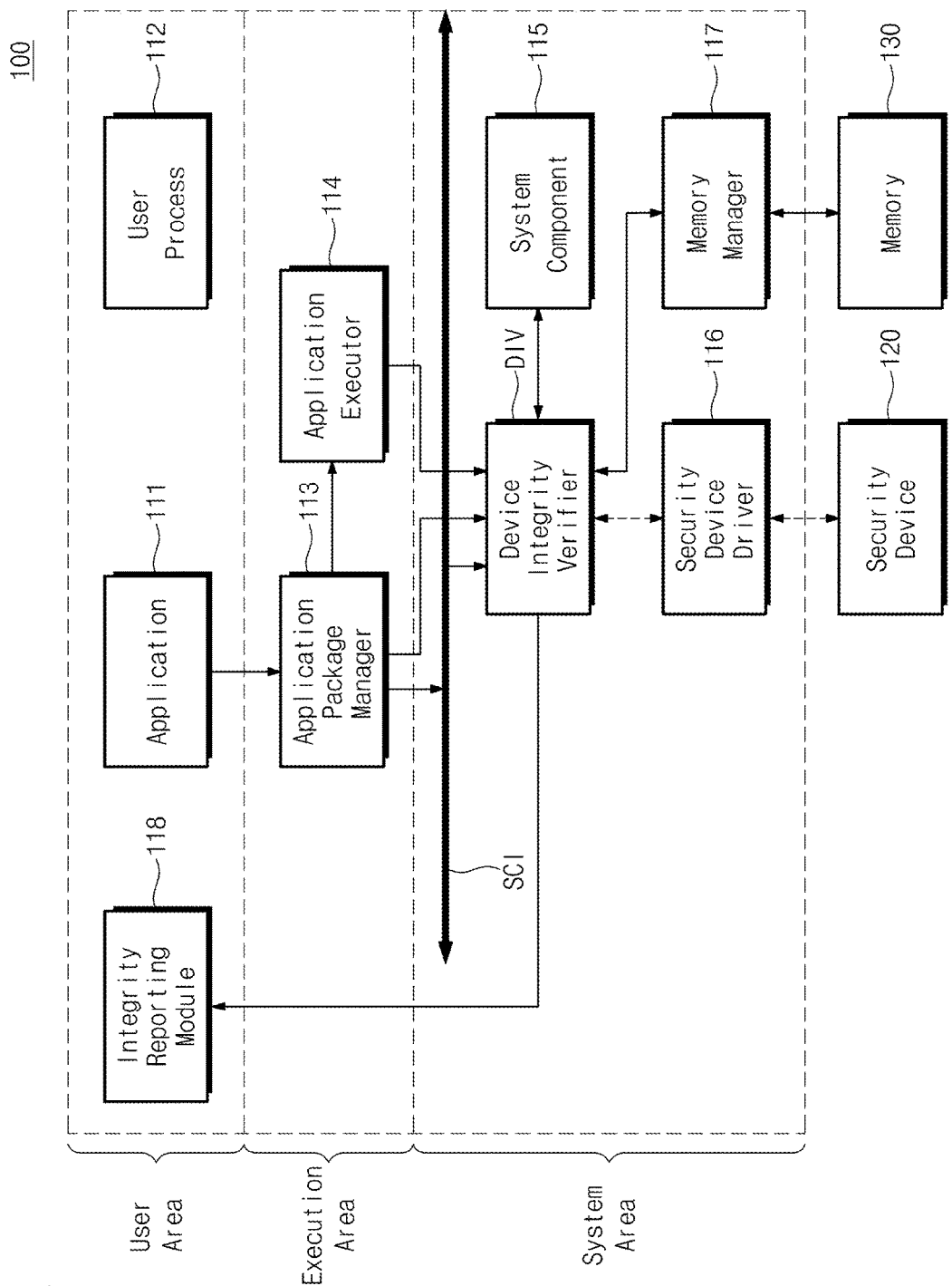
FIG. 4 illustrates in detail a software layer of the user device of FIG. 1.

FIG. 4 illustrates in detail a software layer of the user device of FIG. 1. For example, elements or some of the elements illustrated in FIG. 4 are realized in a software type and may be driven by the AP 110 of FIG. 1. However, the scope of the inventive concept is not limited hereto, and the elements of FIG. 4 may be realized in software or hardware type.

Referring to FIG. 4, the user device 100 (or the software layer of the user device 100) includes a user area, an execution area, and a system area. The user area includes an application 111, a user process 112, and an integrity reporting module 118. For example, the execution area and system area may be included in a kernel area of the user device 100. In addition, the elements of the FIG. 4 may directly communicate with each other or communicate through a system call interface (SCI). The SCI provides a communication channel through which an element included in the user area accesses information in a kernel area (i.e. an execution area or system area) or hardware.

The application 111 indicates a program installed and executed in the user device 100. The user process 112 indicates a user program realized with a native language (e.g. C/C++, or the like) that the user device 100 supports. For example, the application 111 may be an application program in user process 112, which operates on the basis of interaction with a user. For example, the user process 111 may access the system area through a SCI without support of the execution area.

The integrity reporting module 118 may receive an integrity verification result for a verification target from the device integrity verifier DIV and transmit the received verification result to an external device (e.g. a monitoring server).

The execution area includes an application package manager 113 and application executor 114. The application package manager 113 performs installation of the application 111. The application package manager 113 manages metadata such as an installation path, version information, use authority, data storage location, or the like related to the application 111. The application package manager 113 performs installation of the application 111.

The application executor 114 may call a system component (e.g. a system library, system demon, system module, or the like) required to execute the application 111 through the SCI.

The system area includes the device integrity verifier DIV, a system component 115, a security device driver 116, and a memory manager 117. The device integrity verifier DIV may detect an event for loading the system component 115 to the memory 130 or accessing the memory 130 to which the system component is loaded through the SCI. The device integrity verifier DIV may extract an integrity value for a corresponding system component in response to the detected event. For example, loading the system component 115 to the memory 130 may be requested by the user process 112 through the SCI. In this case, the device integrity verifier DIV extracts the integrity value of the system component 115 and transmits the extracted integrity value to the security device 120 through the security device driver 116. The security device 12 performs an integrity verification operation for the system component 115 on the basis of the received integrity value and transmits the verification result to the device integrity verifier DIV. The device integrity verifier DIV may transmit a log message for the verification result to the integrity reporting module.

For example, the device integrity verifier DIV may perform an integrity verification operation for the application 111 installed or executed by the application package manager 113, and an integrity verification operation for the system components that are necessary for execution of the application 111. For example, when the application 111 is executed by the application package manager 113, the application package manager 113 may load the system component 115 required for execution of the application 111 to the memory 130 or access the memory 130, in which the system components are loaded, through the SCI. The device integrity verifier DIV may detect the above described event and perform integrity verification for a corresponding system component.

For example, the device integrity verifier DIV may selectively perform the integrity verification operation according to the booting operation or verification policies described in relation to Tables 1 and 2.

The system component 115 may include elements such as a kernel module, kernel process, and system library included in the kernel of the user device 100. For example, the application 111 and user process 112 of the user area may access a kernel memory area or other devices included in the user device 100 through the system component 115.

The security device driver 116 provides interfacing between the device integrity verifier DIV and security device 120. For example, the security device driver 116 supports message delivering and scheduling between the device integrity verifier DIV and security device 120, but may not support data reading for the integrity value or verification result. In other words, data would not be leaked through the security device driver 116.

The memory manager 117 may load the system component 115 to the memory or manage an access to the memory 130 according to a request through the SCI. For example, the memory manager 117 may manage the load and access to the memory 130 under a control of the device integrity verifier DIV.

Figure 5:
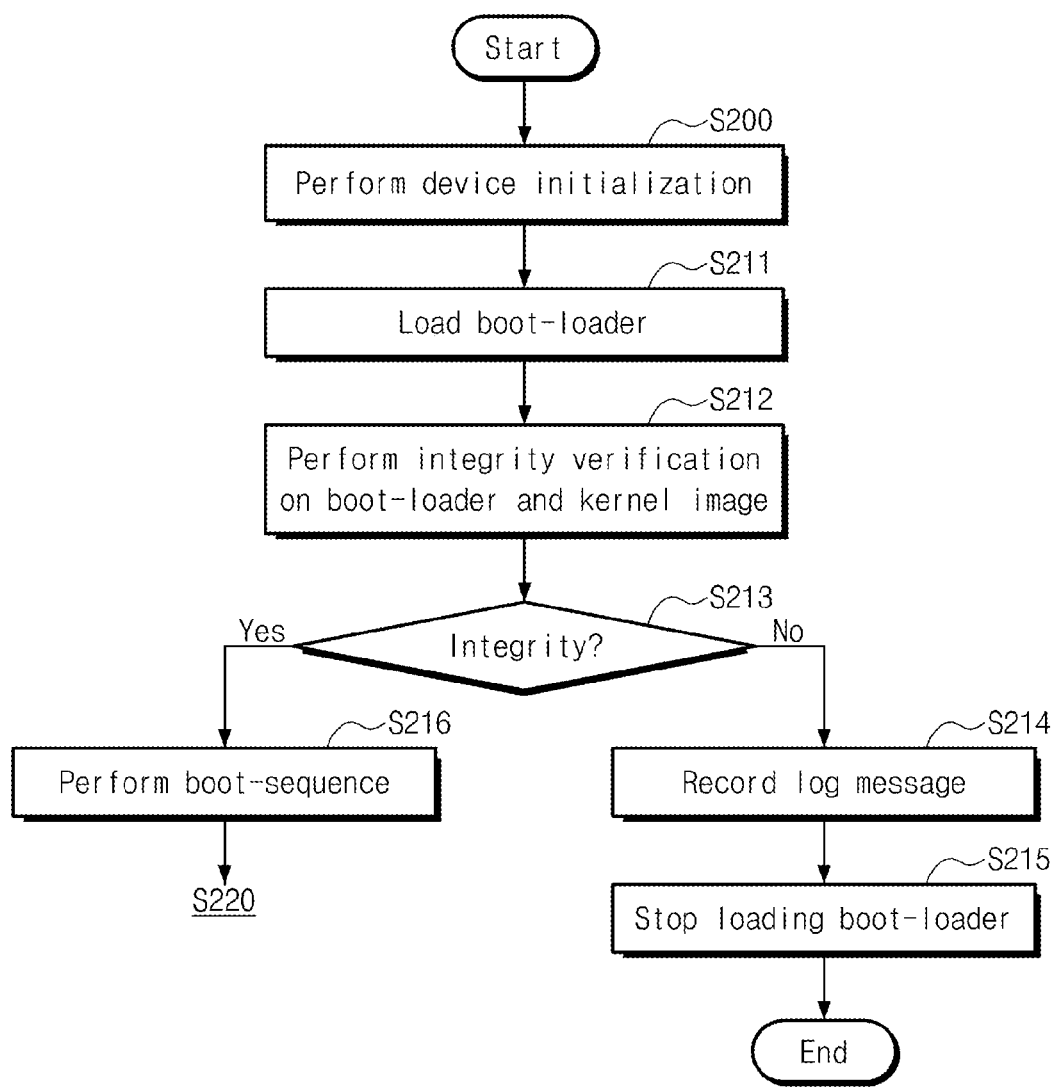
FIG. 5 is a flowchart illustrating in detail operation S100 and operation S210 of FIG. 3.
Figure 6:
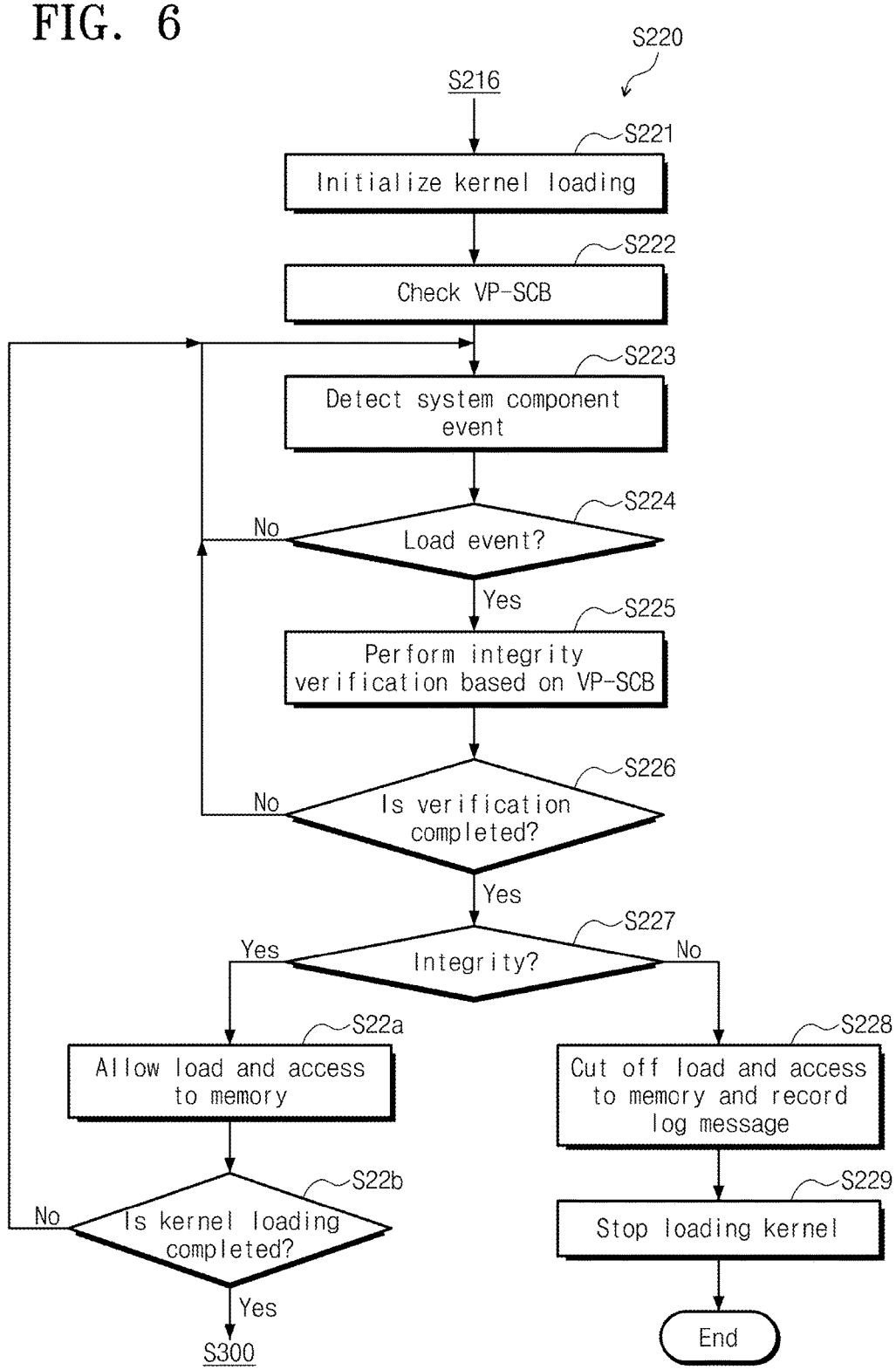
FIG. 6 is a block diagram illustrating in detail operation S220 of FIG. 3.
Figure 7:
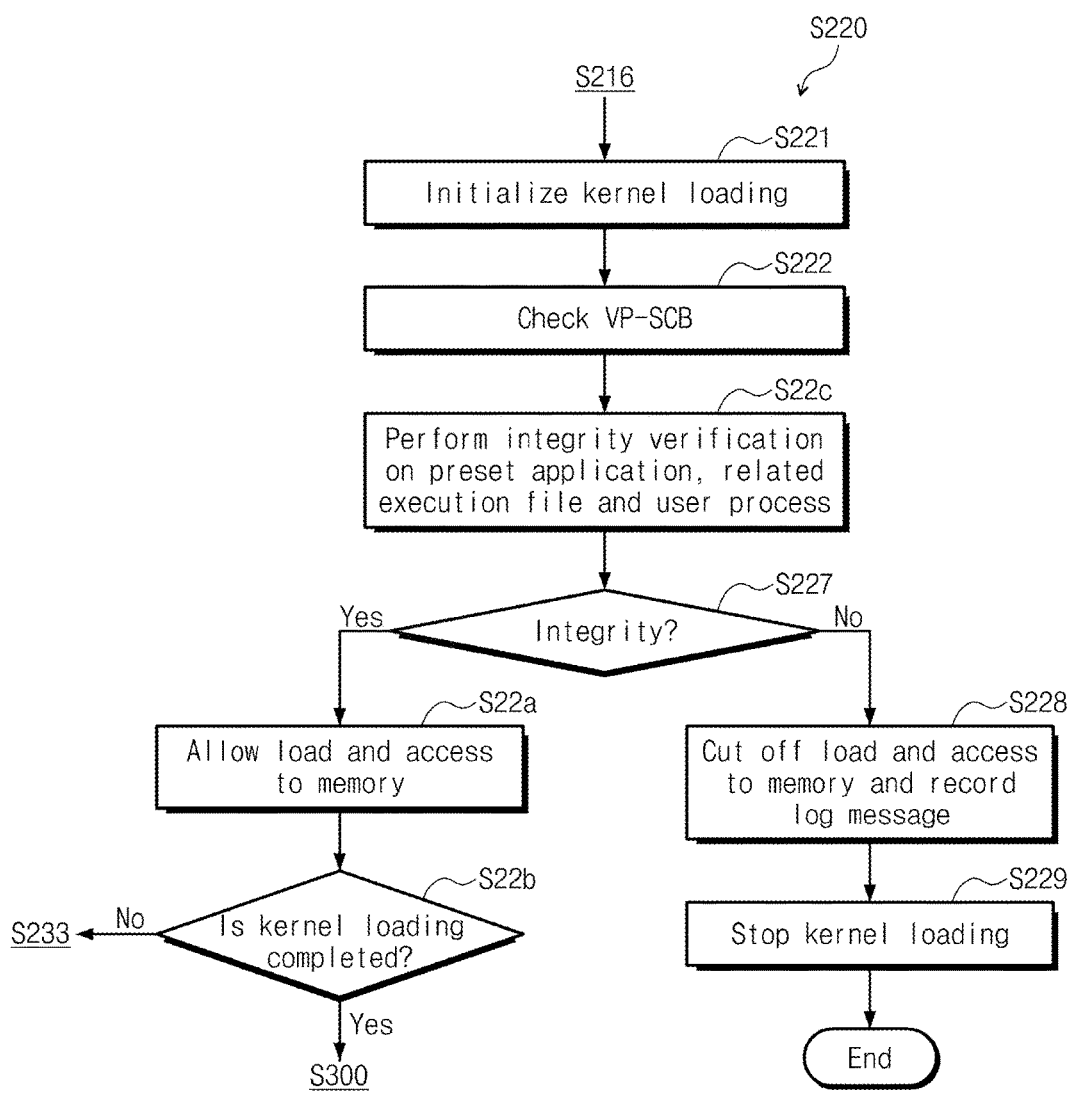
FIG. 7 is a flowchart illustrating another operation of operation S220 of FIG. 3.
Figure 8:
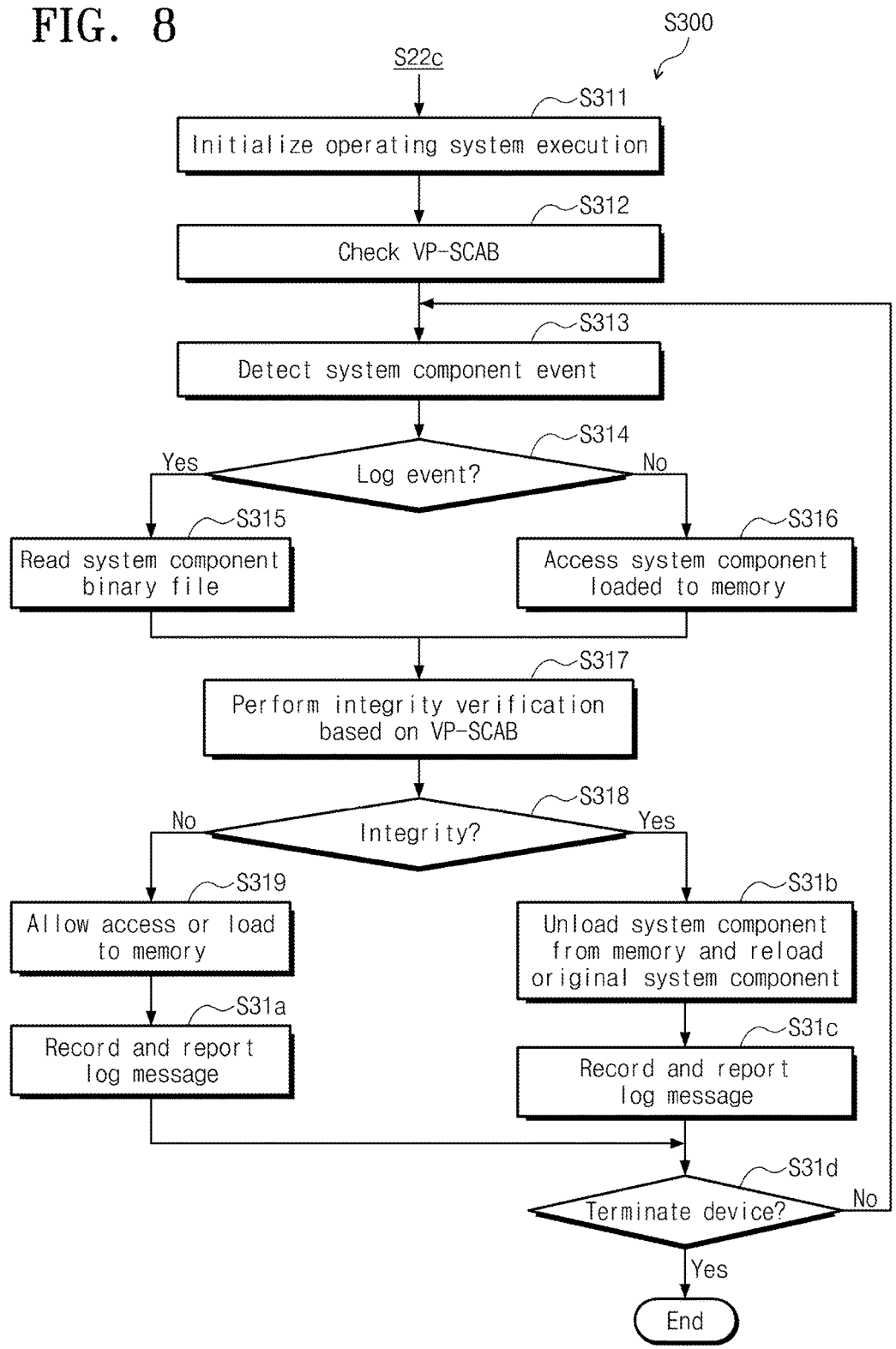
FIG. 8 is a flowchart illustrating in detail operation S300 of FIG. 3.
Figure 9:
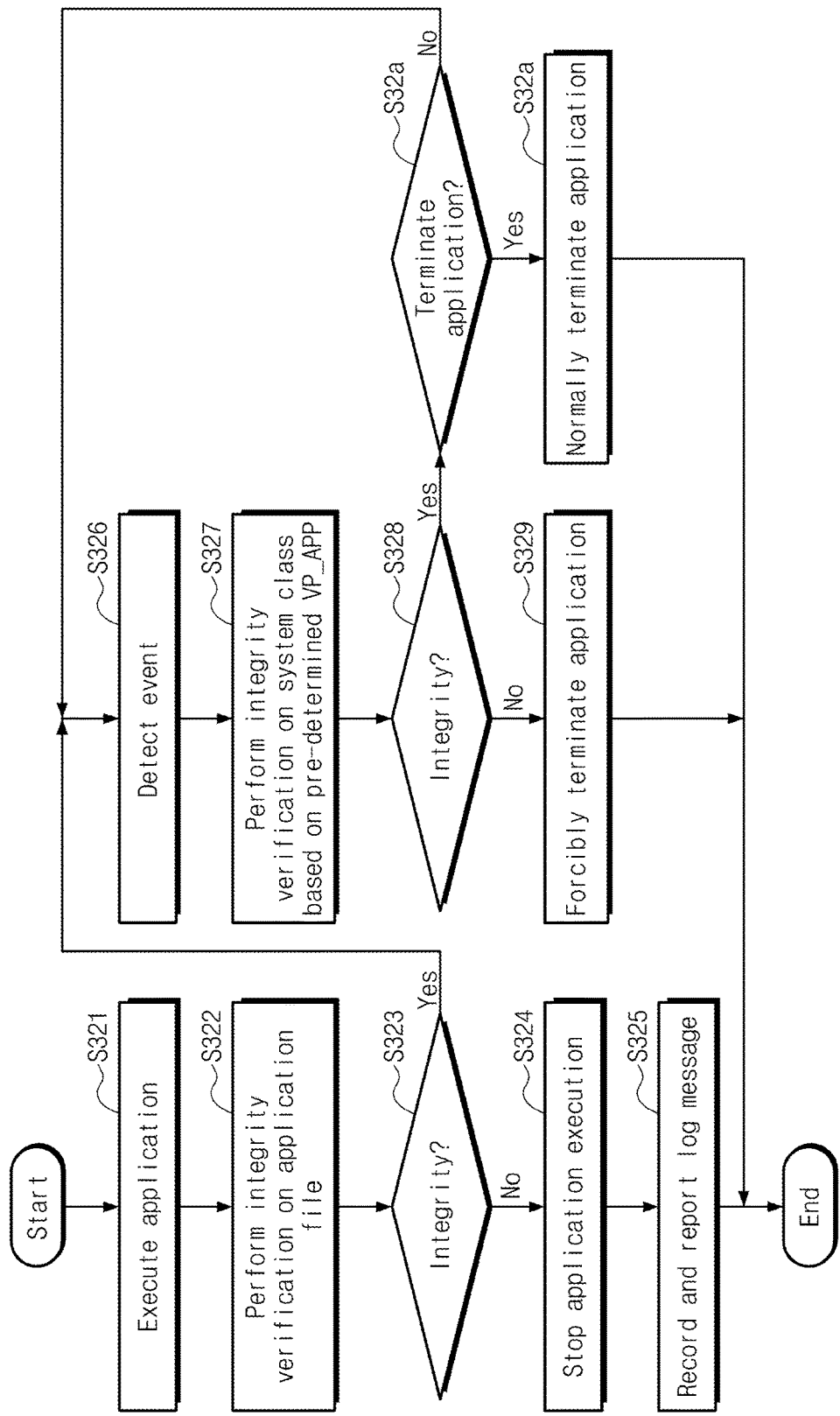
FIG. 9 is a flowchart illustrating another operation of operation S300 of FIG. 3.

FIGS. 5 to 9 are flowcharts illustrating in detail an operation of the user device of FIG. 3. For example, FIG. 5 is a flowchart illustrating in detail operation S100 and operation S210 of FIG. 3. FIG. 6 is a block diagram illustrating in detail operation S220 of FIG. 3. FIG. 7 is a flowchart illustrating another operation of operation S220 of FIG. 3. FIG. 8 is a flowchart illustrating in detail operation S300 of FIG. 3. FIG. 9 is a flowchart illustrating another operation of operation S300 of FIG. 3.

Hereinafter, referring to FIGS. 5 to 9, the booting operation and integrity verification operation of the user device 100 will be described in detail. For brief explanation, each operation to be described below is performed by the user device 100. However, the scope of the inventive concept is not limited hereto, and each operation may be performed by the AP 110, device integrity verifier DIV, and security device 120 of the user device 100, or separate software or hardware.

Firstly, referring to FIGS. 1 and 5, in operation S100, the user device 100 may perform device initialization. Operation S100 has been described in relation to FIG. 3 and a detailed description thereabout will be omitted.

In operation S211, the user device 100 loads the boot-loader. For example, the boot-loader is loaded to a predetermined area of the memory 130.

In operation S212, the user device 100 may perform integrity verification for the boot-loader and kernel image. For example, the device integrity verifier DIV may generate integrity values of the boot-loader and kernel image and transmit the generated integrity values to the security device 120. The security device 120 may perform integrity verification for the boot-loader and kernel image on the basis of the received integrity values. The verification result is transmitted to the device integrity verifier DIV. For example, the integrity verification in operation S212 may be static verification. The static verification indicates integrity verification for a predefined element in a predetermined code execution operation regardless of an occurrence time of a predetermined event.

In operation S213, the user device 100 may determine whether the integrity is ensured. As a detailed example, the user device 100 may determine whether the integrities of the boot-loader and kernel image is ensured according to the integrity verification result of operation S212.

When the integrity is not ensured (i.e. when the boot-loader or kernel image is modified, or the integrity is damaged) in operation S214, the user device 100 records the log message. For example, the log message may include information on a verification target, integrity value, and verification time. For example, the recorded log message may be transmitted to an external device through the integrity reporting module 118 (see FIG. 4).

Then, in operation S215, the user device 100 stops loading the boot-loader. In other words, the user device 100 terminates the booting operation.

When the integrity is ensured, in operation S216, the user device 100 continuously performs the booting sequence. For example, the user device 100 may load the boot-loader to the memory and execute the boot-loader to load the kernel image to the memory 130. Then, operation 220 may be performed.

Referring to FIGS. 1 and 6, operation S216 is performed, and then the user device 100 performs operation S220. Operation S220 includes operations S221 to S22c. Firstly, operations S221 to S22b will be described with reference to FIGS. 1 and 6.

In operation S221, the user device 100 starts to load the kernel image. For example, the kernel may be loaded to the memory 130, while the kernel image loaded to the memory 130 is uncompressed.

In operation S222, the user device 100 may check a verification policy of system component on booting (VP_SCB). For example, the VP_SCB may be set in advance to be any one of first to fourth system component verification policies described in relation Table 1. The user device 100 may check the preset VP_SCB.

In operation S223, the user device 100 may detect a system component event. For example, while the kernel is loaded, an event that the system components are loaded to the memory 130 may occur. The device integrity verifier DIV may detect the event that the system components are loaded to the memory 130 through the SCI. For example, the device integrity verifier DIV may perform hooking on a system call corresponding to the event and obtain a control authority. In other words, thereafter, a related event may occur according to a control of the device integrity verifier DIV.

In operation S224, the user device 100 may determine whether the detected event is a load event. For example, the detected event may be an event for loading a system component to the memory 130 or an event for accessing the memory 130 to which the system component is loaded. When the detected event is the event for accessing the memory 130 to which the system component is loaded, the user device 100 may perform operation S223 again.

When the detected event is the loading event, in operation S225, the user device 100 may perform integrity verification on the basis of the VP_SCB. For example, when the detected event is the loading event, the user device 100 may read a binary file of a corresponding system component and perform integrity verification on the read binary file. For example, the binary file of the system component may be information included in the kernel area of the user device 100. At this point, the user device performs the integrity verification on the VP_SCB. As an example, when the VP_SCB is the first system component verification policy (see Table 1), the user device 100 performs the integrity verification on the read individual file. Similarly, when the VP_SCB is any one of the second to fourth system component verification policies (see Table 1), the user device 100 will perform the integrity verification according to a corresponding verification policy.

In operation S226, the user device 100 may determine whether the integrity verification is completed. For example, the user device 100 may determine whether the integrity verification is completed for a verification target (i.e. system components to be loaded) according to the VP_SCB.

When the integrity verification is not completed, the user device 100 re-performs operation S223 to detect a new event.

When the integrity verification is completed, in operation S227, the user device 100 may determine whether the integrities of the verification targets are ensured. For example, the device integrity verifier DIV may receive the integrity verification result from the security device 120.

When the integrity is not ensured, in operation S228, the user device 100 cuts off the access to and load to the memory 130, and records a log message. For example, the recorded log message may be transmitted to an external device through the integrity reporting module 118. Then, in operation S229, the user device 100 stops loading the kernel. In other words, the user device 100 terminates the booting operation.

When the integrity is ensured, in operation S22a, the user device 100 allows the load and access to the memory 130. For example, in operation S22a, the user device 100 may record the log message for the integrity verification result.

Then, in operation S22b, the user device 100 may determine whether the kernel loading is completed. When the kernel loading is not completed, the user device 100 re-performs operation S223 to detect a new event. When the kernel loading is completed, the user device 100 may perform operation S300.

Then, referring FIGS. 1 and 7, at the time of kernel loading, the user device 100 may perform integrity verification on an application together with the integrity verification of the system component described in relation to FIG. 6. In other words, as illustrated in FIG. 7, the user device 100 may perform operation S22c after performing operations S221 and S222. In operation S22c, the user device 100 may perform integrity verification for a pre-installed application, related execution environment file, and user process. For example, operation S22c may be performed together with the integrity verification for the system component described in relation to FIG. 6. For example, the integrity verification in operation S22c may be static verification.

Then the user device 100 may perform operations of S227 to S22b. Since operations of S227 to S22b are described in relation to FIG. 6, a detailed description thereabout will be omitted.

Next, referring to FIGS. 1 and 8, in operation S22c, the user device 100 may perform operation S300. Operation S300 includes operations S311 to S31d. For example, operations S311 to S31d are an integration verification operation for a system component under an operating system.

In operation S311, the user device 100 may execute the operating system. For example, completion of operation S22c means that a booting operation of a device platform of the user device 100 is completed. In other words, in operation S311, when executing the operating system, the user device 100 may be in a state where a data or command input, or a hardware control by a user is possible under the operating system.

In operation S312, the user device 100 may check the verification policy of system component after booting (VP_SCAB). For example, the VP_SCAB may be set in advance to be any one of first to fourth system component verification policies described in relation to Table 1.

In operation S313, the user device 100 may detect a system component event. For example, a load request for a system component or an access request to the memory 130 may occur by the user process 112. The device integrity verifier DIV may detect the event for the load request or access request through the SCI. For example, the device integrity verifier DIV may perform hooking on a system call of the load request or access request and obtain a control authority.

In operation S314, the user device 100 may determine whether the detected event is a load event.

When the detected event is the load event, in operation S315, the user device 100 reads a binary file of a corresponding system component. When the detected event is not the load event (i.e. a case of the access event), the user device 100 accesses the corresponding system component loaded to the memory 130.

In operation S317, the user device 100 performs the integrity verification on the corresponding system component on the basis of the VP_SCAB. Since operation S317 is similar to Table 1 and operation S225 of FIG. 6, a detailed description thereabout will be omitted.

In operation S318, the user device 100 may determine whether the integrity of the verification target is ensured.

When the integrity is ensured, in operation S319, the user device 100 allows the load and access to the memory 130. In other words, the user device 100 may perform an operation corresponding to the detected event. In operation S31a, the user device 100 may record a log message and report it. Then, in operation S31d, the user device 100 may determine whether to be in a device termination state. According to the determination result, when the device is not in the device termination state, the user device 100 may re-perform operation S313 to detect a new event.

According to the determination result of operation S318, when the integrity is not ensured, in operation S31b, the user device 100 unloads the system component from the memory 130 and re-loads an original system component. For example, the user device 100 may cut off the system component from being loaded to the memory 130.

In operation S31c, the user device 100 may record a log message and report it. Then, the user device 100 may perform operation S31d.

Next, referring to FIGS. 1 and 9, after operation S22c, the user device 100 may perform operation S300. Operation S300 may further include operations S321 to S32b. For example, operations S311 to S31d described in relation to FIG. 8 and operations S321 to S32b described in relation to FIG. 9 may be performed in parallel.

As described above, completion of operation S22c means that a booting operation of a device platform of the user device 100 is completed. In other words, in operation S311, when executing the operating system, the user device 100 may be in a state where a data or command input, or a hardware control by a user is possible under the operating system.

In operation S321, the user device 100 may execute the application 111. For example, the application package manager 113 may execute the application 111 according to a user request.

In operation S322, the user device 100 performs integrity verification on the application 111 (in particular, on an installation file of the application). For example, the device integrity verifier DIV performs the integrity verification on the installation file of the application 111.

In operation S323, the user device 100 may determine whether the integrity of the application 111 to be executed is ensured.

When the integrity is not ensured, in operation S324, the user device 100 stops execution of the application 111. For example, the device integrity verifier DIV may request execution stop of the application 113 from the application package manager 113.

Then, in operation S325, the user device 100 may record a log message and report it.

According to the determination result in operation S323, when the integrity is ensured, the user device 100 may detect an event in operation S326. For example, the device integrity verifier DIV may detect a load request for a system class to the memory 130 or an execution request, which is performed by the application package manager 113, through the SCI. For example, the system class includes various informations requested for execution of the application 111.

In operation S327, the user device 100 performs integrity verification on the system class on the basis of a pre-determined verification policy of application (VP_APP). For example, the pre-determined VP_APP may be set in advance to be any one of first to third application verification policies described in relation Table 2. As described in relation to Table 2, the device integrity verifier DIV may perform integrity verification on the system class on the basis of the pre-determined VP_APP.

In operation S328, the user device 100 may determine whether the integrity of the system class is ensured.

When the integrity of the system class is not ensured, in operation S329, the user device 100 forcibly terminates the application 111. For example, the device integrity verifier DIV may request forced termination of the application 111 from the application package manager 113 or application executor 114.

When the integrity of the system class is ensured, in operation S32a, the user device 100 may determine whether the application 111 is terminated. When the application 111 is terminated, in operation S32b, the user device 100 normally terminates the application 111. For example, the device integrity verifier DIV may request normal termination from the application package manager 113.

When the application 111 is not terminated, the user device 100 may re-perform operation S326 to detect a new system class event.

For example, in the execution process of the application, which is described in relation FIG. 9, a load request or access request for the system component may occur. In this case, the integrity verification for the system component, which is described in relation to FIG. 8, will be performed. In other words, while the user device 100 is normally booted to drive an operating system, the system device 100 may perform the integrity verification operations for the system component, application, system class, and the like, which are described in relation to FIGS. 8 and 9, in serial or in parallel.

For example, in embodiments of the inventive concept described in relation to FIGS. 1 to 9, it is described that the device integrity verifier DIV performs the integrity verification on the system component, application file, system class, or the like, but the scope of the inventive concept is not limited hereto. The device integrity verifier DIV according to the technical idea of the inventive concept may be realized with separate device integrity verifiers according to operations (e.g. boot-loader loading, kernel loading, operating system execution, or the like) of the user device 100. For example, in the boot-loader loading operation, the integrity verification may be performed by the device integrity verifier DIV realized on the boot-loader, and in the kernel loading operation, the integrity verification operation may be performed by the device integrity verifier DIV realized on the kernel.

In addition, the device integrity verifier DIV may be realized with separate device integrity verifiers according to a verification target. For example, the device integrity verifier DIV may include a system component integrity verifier and an application integrity verifier. The system component integrity verifier may be realized on the system area of the user device 100 to perform integrity verification on a system component. The application integrity verifier may be realized on the execution area of the user device 100 to perform integrity verification on an application file and system class. However, the scope of the inventive concept is not limited hereto and it may be understood that the device integrity verifier DIV according to the technical idea of the inventive concept may be diversely modified.

Figure 10:
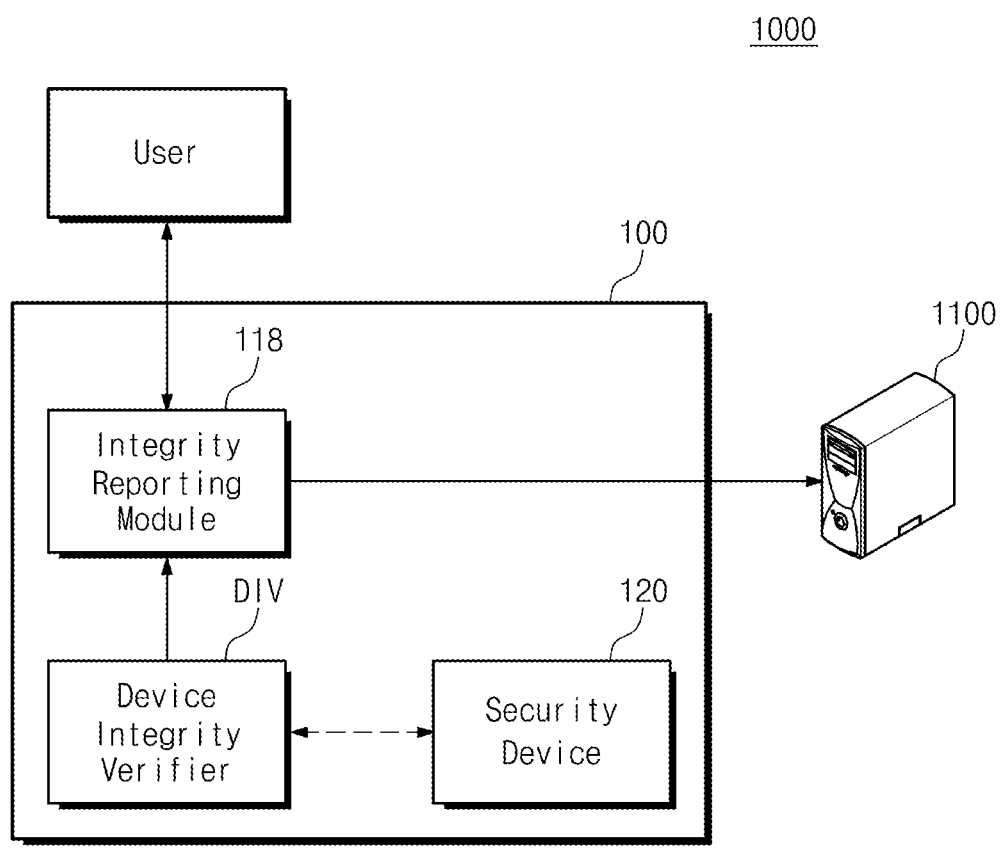
FIG. 10 exemplarily illustrates a user system according to an embodiment of the inventive concept.

FIG. 10 exemplarily illustrates a user system according to an embodiment of the inventive concept. For conciseness of explanation and drawing, unnecessary and repetitive explanations about elements of a user system of FIG. 10 will be omitted.

Referring FIG. 10, the user system 100 includes the user device 100 and a monitoring server 1100. The user device 100 includes the device integrity verifier DIV, security device 120, and integrity reporting module 118. For example, the user device 100 may operate based on an operation method described in relation to FIGS. 1 to 9.

For example, the user device 100 may transmit an integrity verification result (or a log message) to the monitoring server 1100. For example, the integrity reporting module 118 may transmit a log message including results of integrity verifications of the device integrity verifier DIV and the security device 120 to the monitoring server 1100. The monitoring server 1100 may store the received log message and perform a reliability determination job for various user devices on the basis of the stored log message. For example, the integrity reporting module 118 may provide the log message to the user through a user interface 160 (see FIG. 1) (e.g. a display). For example, the log message transmitted by the integrity reporting module 118 may include a verification target (e.g. a system component or system class), extracted integrity value, verification result, and verification time.

The user device 100 according to an embodiment of the inventive concept may verify integrity of the user device by using a separate verification method (e.g. dynamic verification, static verification, or separate verification policy) according to each operation such as device initialization, boot-loader loading, kernel loading, operating system execution, or the like, or according to the verification target. Accordingly, compared to typical integrity verification methods, the user device 100 according to an embodiment of the inventive concept influences to a minimum on performance degradation and power consumption of the user device 100.

In addition, an overhead (e.g. increase in power consumption, increase in calculation time, or the like) according to operation of the security device 120 becomes reduced by realizing the security device 120 on the basis of a minimum calculation processor required for integrity verification and information (e.g. integrity verification-related data) for verification.

In addition, hierarchical reliability for a user area and system area configuring the user device 100 is ensured by performing integrity verification for a system class and system component related to an application in addition to the application in the user area.

According to embodiments of the inventive concept, performance of the user device may be improved and power consumption thereof may be reduced by applying different integrity verification methods according to each operation (e.g. initialization, boot-loader execution, kernel execution, operating system execution, or the like) and a verification target of each operation. In addition, reliability for all layers of the user device may be improved by performing integrity verification on system components in each operation in addition to a program code (e.g. application, process, or the like) of a user device. In addition, an overhead according to additional use of hardware for integrity verification may be reduced by minimizing a configuration of a security device.

Accordingly, a user device having improved performance, improved reliability, and reduced power consumption, and an integrity verification method for the same may be provided.

The above-disclosed subject matter is to be considered illustrative and not restrictive, and the appended claims are intended to cover all such modifications, enhancements, and other embodiments, which fall within the true spirit and scope of the inventive concept. Thus, to the maximum extent allowed by law, the scope of the inventive concept is to be determined by the broadest permissible interpretation of the following claims and their equivalents, and shall not be restricted or limited by the foregoing detailed description.

What is claimed is:

1. An integrity verification method performed by a user device, the integrity verification method comprising:
    verifying integrity of a first verification target on a basis of a Verification Policy of System Components on Booting (VP_SCB) during executing a boot-loader;
    uncompressing a kernel image according to the integrity verification result for the first verification target;
    verifying integrity of a second verification target on a basis of a Verification Policy of System Components After Booting (VP_SCAB) after the kernel image is uncompressed; and
    driving an operating system according to the integrity verification result for the second verification target and verifying integrity of a third verification target on a basis of a Verification Policy of Applications (VP_APP) while the operating system is driven,
    wherein the first verification target comprises the boot-loader and kernel image, the second verification target comprises a first system component and files related to a pre-installed application, and the third verification target comprises a second system component and files related to an application to be executed,
    wherein each of the VP_SCB VP_SCAB, and VP_APP respectively include a static verification scheme or a dynamic verification scheme according to the first, second, and third verification targets,
    wherein the VP_SCB comprises at least a first policy selected from a first policy group consisting of a policy for verifying integrity for all system components, a policy for verifying integrity for a selected system component among the system components, a policy for grouping the system components to verify integrity, and a policy for verifying integrity of the system component on a basis of an accumulated one way hash function,
    wherein the VP_SCAB comprises at least a second policy selected from the first policy group,
    wherein the VP_APP comprises at least a third policy selected from a second policy group consisting of a policy for verifying application installation files and all parts of system classes obtained by the second system component, a policy of verifying application installation files and only execution code areas of the system classes obtained by the second system component, and a policy for performing integrity verification only for application installment files, and
    wherein the user device is a resource-limited device.

2. The integrity verification method of claim 1, further comprising executing a boot control code to perform initialization before the boot-loader is executed.

3. The integrity verification method of claim 1, wherein the verifying of integrity of the first verification target comprises:
    extracting integrity values of the boot-loader and kernel image;
    verifying integrities of the boot-loader and kernel image on a basis of the integrity values; and
    stopping the execution of the boot-loader when the integrities of the boot-loader and kernel image are damaged.

4. The integrity verification method of claim 3, wherein the VP_SCB is the static verification scheme in which the integrity verification is performed every time the boot-loader is executed.

5. The integrity verification method of claim 1, wherein the verifying of integrity of the second verification target comprises:
    detecting an event for the first system component;
    verifying integrity of the first system component on a basis of the VP_SCB before booting when the event is a load event to a memory; and
    performing the event for the first system component when the integrity of the first system component is ensured, and recording a log message without performing the event for the first system component when the integrity of the first system component is damaged.

6. The integrity verification method of claim 5, further comprising:
setting the VP_SCB before booting to comprise the first policy selected from the first policy group,
wherein the user device can perform each of the policies included in the first policy group.

7. The integrity verification method of claim 5, wherein the verifying of integrity of the second verification target further comprises verifying integrity of files related to a preset application.

8. The integrity verification method of claim 7, wherein the VP_SCAB comprises the dynamic verification scheme in which the integrity verification is performed according to whether the event for the first system component occurs and the static dynamic verification scheme in which the integrity verification is performed for files related to the preset application.

9. The integrity verification method of claim 1, wherein the verifying of integrity of the third verification target comprises:
detecting an event for the second system component;
determining whether the event is a load event to a memory;
reading a binary file of the second system component when the event is the load event and reading the second system component stored in the memory when the event is not the load event;
verifying integrity of the read second system component on a basis of the VP_APP; and
performing the event when the integrity of the read second system component is ensured, and recording a log message without performing the event when the integrity of the read second system component is damaged.

10. The integrity verification method of claim 9, wherein the verifying of integrity of the third verification target further comprises:
verifying integrity of an installation file of the application to be executed; and
stopping execution of the application to be executed when the integrity of the installation file of the application to be executed is damaged, and recording the log message.

11. The integrity verification method of claim 10, wherein the verifying of integrity of the third verification target further comprises:
detecting an event for a system class related to the application to be executed when the integrity of the installation file of the application to be executed is ensured;
verifying the integrity of the system class on a basis of the VP_APP; and
forcibly terminating the application to be executed when the integrity of the system class is damaged.

12. A user device comprising:
an application processor configured to perform a booting operation comprising a device initialization operation, boot-loader execution operation, kernel execution operation, and operating system driving operation;
a memory to which a system component and application-related files are loaded according to a control of the application processor;
a device integrity verifier circuit configured to extract integrity values of the system component or the application-related files according to each operation of the booting operation; and
a security device circuit configured to verify integrity of a verification target on a basis of the extracted integrity values,
wherein the device integrity verifier circuit is further configured to:
receive a first verification result of a first verification target according to a Verification Policy of System Components on Booting (VP_SCB) from the security device circuit during the boot-loader execution operation,
stop an operation according to the first verification result to terminate the booting operation,
uncompress a kernel image according to the first verification result,
receive a second verification result of a second verification target according to a Verification Policy of System Components After Booting (VP_SCAB) from the security device circuit after the kernel image is uncompressed and before the operating system driving operation,
stop an operation for the system component or application-related files according to the second verification result to terminate the booting operation,
drive an operating system according to the second verification result, and
receive a third verification result of a third verification target according to a Verification Policy of Applications (VP_APP) from the security device circuit while the operating system is driven, and
wherein the first verification target comprises the boot-loader and kernel image, the second verification target comprises a first system component and files related to a pre-installed application, and the third verification target comprises a second system component and files related to an application to be executed,
wherein each of the VP_SCB, VP_SCAB, and VP_APP respectively include a static verification scheme or a dynamic verification scheme according to the first, second, and third verification targets,
wherein the VP_SCB comprises at least a first policy selected from a first policy group consisting of a policy for verifying integrity for all system components, a policy for verifying integrity for a selected system component among the system components, a policy for grouping the system components to verify integrity, and a policy for verifying integrity of the system component on a basis of an accumulated one way hash function,
wherein the VP_SCAB comprises at least a second policy selected from the first policy group,
wherein the VP_APP comprises at least a third policy selected from a second policy group consisting of a policy for verifying application installation files and all parts of system classes obtained by the second system component, a policy of verifying application installation files and only execution code areas of the system classes obtained by the second system component, and a policy for performing integrity verification only for application installment files, and wherein the user device is a resource-limited device.

13. The user device according to claim 12, wherein the security device circuit comprises:

a communication circuit configured to perform encrypted serial communication with the device integrity verifier circuit;

a shield memory configured to store data and key values related to integrity verification for the system component and application-related files; and a processor configured to perform the integrity verification on the basis of the extracted integrity values, wherein the security device circuit performs encrypted communication with the device integrity verifier on a basis of the key values.

14. The user device of claim 12, wherein the device integrity verifier circuit is driven according to a control of the application processor.

* * * * *